United States Patent
Sato et al.

(10) Patent No.: US 7,136,123 B2
(45) Date of Patent: Nov. 14, 2006

(54) REFLECTOR FORMED WITH HIGHLY RELIABLE CONDUCTIVE PATTERN, PROCESS FOR FABRICATING REFLECTOR AND LIQUID CRYSTAL DISPLAY UNIT USING THE SAME

(75) Inventors: Yasuhiro Sato, Tokyo (JP); Hideki Kaneko, Tokyo (JP); Michiaki Nishiyama, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 0 days.

(21) Appl. No.: 10/985,003

(22) Filed: Nov. 10, 2004

(65) Prior Publication Data

US 2005/0083458 A1    Apr. 21, 2005

Related U.S. Application Data

(62) Division of application No. 09/897,909, filed on Jul. 5, 2001, now Pat. No. 6,867,832.

(30) Foreign Application Priority Data

Jul. 6, 2000    (JP) .............................. 2000-205007

(51) Int. Cl.
*G02F 1/1335* (2006.01)

(52) U.S. Cl. ........................................ 349/113; 349/67

(58) Field of Classification Search ................ 349/113, 349/67–70, 65, 152
See application file for complete search history.

(56) References Cited

U.S. PATENT DOCUMENTS

| | | | |
|---|---|---|---|
| 4,853,155 A * | 8/1989 | Kurasawa .................... | 252/512 |
| 5,029,984 A | 7/1991 | Adachi et al. | |
| 5,119,106 A | 6/1992 | Murakami | |
| 5,251,064 A * | 10/1993 | Tennant et al. ............. | 359/361 |
| 5,609,704 A | 3/1997 | Hayama et al. | |
| 5,735,590 A * | 4/1998 | Kashima et al. ............... | 362/31 |
| 5,844,731 A * | 12/1998 | Kabumoto et al. ......... | 359/869 |
| 5,857,761 A * | 1/1999 | Abe et al. .................... | 362/551 |
| 5,982,546 A * | 11/1999 | Kawamoto et al. ......... | 359/584 |
| 6,201,586 B1 | 3/2001 | Nakayama | |
| 6,222,689 B1 | 4/2001 | Higuchi et al. | |
| 6,280,890 B1 * | 8/2001 | Sawamura et al. ............. | 430/7 |
| 6,309,081 B1 * | 10/2001 | Furihata ....................... | 362/31 |
| 6,313,891 B1 | 11/2001 | Nagakubo et al. | |

(Continued)

FOREIGN PATENT DOCUMENTS

GB    2118210    10/1983

(Continued)

OTHER PUBLICATIONS

Korean Office Action dated Apr. 22, 2003 with Japanese Translation and Partial English translation.

(Continued)

*Primary Examiner*—Nathan J. Flynn
*Assistant Examiner*—Ahmod N. Sefer
(74) *Attorney, Agent, or Firm*—McGinn IP Law Group, PLLC

(57) ABSTRACT

A reflector is incorporated in a liquid crystal display panel for directing light to an optical path from a lamp to a liquid crystal panel, and a high voltage line is directly connected to an electrode of the lamp, but a low voltage line is connected through a conductive pattern formed on the reflector to the other electrode of the lamp, wherein the conductive pattern is formed from a layer of conductive filler printed on the reflector through thermosetting so that the conductive pattern is thick enough to withstand thermal stress without enlargement of the liquid crystal display unit.

18 Claims, 7 Drawing Sheets

U.S. PATENT DOCUMENTS

| | | | |
|---|---|---|---|
| 6,322,225 B1 | 11/2001 | Koike | |
| 6,603,519 B1 | 8/2003 | Fukiharu et al. | |
| 6,700,637 B1 | 3/2004 | Yano et al. | |
| 2001/0035923 A1 | 11/2001 | Cha et al. | |
| 2002/0015314 A1* | 2/2002 | Umemoto et al. | 362/561 |
| 2002/0027635 A1 | 3/2002 | Sakamaki et al. | |
| 2002/0070478 A1* | 6/2002 | Nissel | 264/211.12 |
| 2002/0070650 A1 | 6/2002 | Kim et al. | |
| 2002/0126470 A1* | 9/2002 | Saito et al. | 362/31 |
| 2002/0141194 A1 | 10/2002 | Wortman et al. | |
| 2002/0149074 A1* | 10/2002 | Imaeda | 257/432 |
| 2003/0053007 A1 | 3/2003 | Higashi | |
| 2003/0067564 A1* | 4/2003 | Sato | 349/58 |
| 2004/0076396 A1* | 4/2004 | Suga | 385/146 |

FOREIGN PATENT DOCUMENTS

| | | | |
|---|---|---|---|
| JP | 6-51308 | 2/1994 | |
| JP | 7-230004 | 8/1995 | |
| JP | 8-5806 | 1/1996 | |
| JP | 8-114802 | 5/1996 | |
| JP | 8-129174 | 5/1996 | |
| JP | 08-152623 | 6/1996 | |
| JP | 8-240720 | * | 9/1996 |
| JP | 8-271890 | | 10/1996 |
| JP | 9-211447 | * | 8/1997 |
| JP | 09-213117 | | 8/1997 |
| JP | 09-306240 | | 11/1997 |
| JP | 10-206847 | | 8/1998 |
| JP | 11-39915 | | 2/1999 |
| JP | 11-064874 | | 3/1999 |
| JP | 11-121169 | | 4/1999 |
| JP | 11-149254 | | 6/1999 |
| JP | 11-261182 | | 9/1999 |
| JP | 2000-56304 | | 2/2000 |
| JP | 2001-66589 | | 3/2001 |

OTHER PUBLICATIONS

Taiwanese Office Action dated May 25, 2004 with partial English translation.

Japanese Office Action dated Aug. 27, 2003 with a partial English translation.

Japanese Office Action dated Nov. 26, 2003 with partial English translation.

* cited by examiner

REFLECTOR FORMED WITH HIGHLY RELIABLE CONDUCTIVE PATTERN, PROCESS FOR FABRICATING REFLECTOR AND LIQUID CRYSTAL DISPLAY UNIT USING THE SAME

The present application is a Divisional application of U.S. patent application Ser. No. 09/897,909 filed on Jul. 5, 2001 now U.S. Pat. No. 6,867,832.

FIELD OF THE INVENTION

This invention relates to a liquid crystal display unit and, more particularly, to a liquid crystal display unit with a reflector, the reflector and a process for producing the reflector.

DESCRIPTION OF THE RELATED ART

The liquid crystal display unit is broken down into a liquid crystal panel, a driving circuit and a light source. Liquid crystal is sealed in the liquid crystal panel, and the driving circuit makes the liquid crystal panel partially vary the transparency of the liquid crystal. Light is radiated from the light source through the liquid crystal panel, and the transmitted light produces images on the liquid crystal panel. Thus, the light source is an important element of the liquid crystal display unit.

The light source includes a lamp, an optical guide plate, a reflector and a power supply cable. The optical guide plate is registry with the liquid crystal panel, and the lamp is opposed to a side surface of the optical guide plate. The lamp is encircled with the reflector. When the electric power is supplied through the power supply cable to the lamp, the light is radiated from the lamp. The light is partially incident onto the side surface of the optical guide plate. Most of the remaining light is radiated toward the reflector, and is reflected from the reflector toward the optical guide plate. The incident light is propagated through the optical guide, and the liquid crystal panel, i.e., the array of pixels is uniformly illuminated by the optical guide plate.

FIG. 1 shows a typical example of the prior art liquid crystal unit. The prior art liquid crystal display unit largely comprises a light source 1, a liquid crystal panel 5 and a circuit board 6. The driving circuit is integrated on the circuit board 6, and the circuit board 6 is attached to a side surface of the liquid crystal panel 5. The light source 1 is assembled with the liquid crystal panel 5, and the liquid crystal panel 5, the light source 1 and the circuit board 6 are accommodated in a suitable housing (not shown).

The light source 1 includes a reflector 2, a power supply cable 3, an optical guide plate 4 and a lamp 10. The optical guide plate 4 is as wide as the liquid crystal panel 5, and has a light output surface. The light output surface is opposed to the back surface of the liquid crystal panel, and the reflector is attached to the side portion of the optical guide plate 4. The reflector has a reflecting surface, which defines a space together with the side surface of the optical guide plate 4. The lamp 10 has a column shape, and is provided in the space. The power supply cable 3 is connected to the lamp 10, and electric power is supplied through the power supply cable 3 to the lamp 10.

The lamp 10 has the column shape, and electrodes are formed on both end surfaces of the lamp 10. The reflector 2 is as long as the lamp 10 (see FIG. 2), and has a channel shape. The upper/lower plate portions project from the upper/lower ends of the vertical plate portion 2a. The lamp 10 is located between the upper plate portion and the lower plate portion, and the electrodes are exposed to both ends of the space defined therebetween. The power supply cable has a high voltage line 3a, a low voltage line 3b and a round cable 32. Though not shown in FIGS. 1 to 3, the high voltage line 3a and the low voltage line 3b are connected to an electric power source. The high voltage line 3a is directly connected to the electrode, and the low voltage line 3b is connected through the round cable 32 to the other electrode. The round cable 32 is as long as the reflector 2, and is provided on the vertical plate portion 2a. The round cable 32 has a circular cross section, and the diameter ranges from 0.5 millimeter to 1.0 millimeter as shown in FIG. 3.

A problem is encountered in that wide space is occupied by the prior art light source. This is because of the fact that the round cable used for connecting the low voltage line 3b to the electrode of the lamp 10. The round cable per se occupies the wide space, and requires additional space between the round cable and another component part.

A flexible flat cable was proposed. FIGS. 4 and 5 show another prior art light source 1. The prior art light source also includes a reflector, a lamp and a power supply cable 32. The reflector and the lamp are similar to those of the prior art light source shown in FIGS. 1 to 3, and are labeled with the same references. The power supply cable 32 includes the high voltage line 3a, the low voltage line 3b and a flexible flat cable 33. The high voltage line 3a and the low voltage line are also connected to an electric power source (not shown). The high voltage line 3a is directly connected to the electrode of the lamp 10, and the low voltage line 3b is connected through the flexible flat cable 33 to the other electrode of the lamp 10. The flexible flat cable 33 is fixed to the vertical portion 2a of the reflector 2 by means of adhesive compound 34. The flexible flat cable 33 is 0.2 millimeter thick, and the adhesive compound layer 34 is of the order of 0.1 millimeter thick. The total thickness is of the order of 0.3 millimeter. Thus, the space occupied by the interconnecting cable is reduced by virtue of the flexible flat cable 33.

Research and development efforts are being made on a compact liquid crystal display panel with wide image production area. This technical goal is to be achieved by reducing the frame area, i.e., the peripheral area around the image production area. The interconnecting cables 32/33 are positioned under the frame area, and, accordingly, have non-ignoreable influence on the frame area. Although the usage of the flexible flat cable 33 results in a fairly narrow frame area, the total thickness of 0.3 millimeter is too far from the goal.

A thin interconnection is proposed in Japanese Patent Publication of Unexamined Application No. 10-206847. FIG. 6 shows the prior art liquid crystal display unit disclosed therein. The circuit board 6 is provided on one side portion of the liquid crystal display panel 5, and the optical guide plate 4 is overlapped with the liquid crystal display panel 5 and the circuit board 6. A light source 35 is provided on one side of the optical guide plate 4, and also includes a reflector 2, a lamp 10 and a power supply cable 35. A space is defined by the reflector 2 and the optical guide plate 4, and the lamp 10 is provided in the space. Electric power is supplied from an electric power source through the power supply cable to the lamp 10. The high voltage line (not shown), the low voltage line (not shown) and an interconnection 36 form the power supply cable 35. The interconnection 36 is implemented by a thin conductive layer deposited on the outer surface of the reflector through an evaporation technique. The interconnection 36 ranges from 0.0005 millimeter thick to 0.001 millimeter thick. The interconnection 36 is drastically reduced in thickness, and makes the frame area narrow.

The interconnection 36 is conducive to the reduction of the frame area. However, the interconnection 36 deposited through the evaporation technique is less reliable. Disconnection, cracks and peel-off are liable to take place after the completion of the liquid crystal display panel. The disconnection, cracks and peel-off are due to thermal stress or other external force exerted on the extremely thin interconnection. Not only the light but also heat is radiated from the lamp 10, and the heat raises the temperature of the reflector 2. The difference in thermal expansion coefficient between the reflector and the interconnection 36 gives rise to the thermal stress, and the extremely thin interconnection can not withstand the thermal stress. When mechanical force is undesirably exerted on the reflector 2, the reflector 2 is deformed, and the extremely thin interconnection can not withstand the deformation.

Another problem inherent in the prior art interconnection 36 is high production cost. The evaporation system is expensive, and the throughput is not large. The extremely thin interconnection is deposited through the expensive evaporation system at a low throughput. This results in the high production cost.

SUMMARY OF THE INVENTION

It is therefore an important object of the present invention to provide a reflector on which a durable thin interconnection is formed.

It is also an important object of the present invention to provide a process for economically producing the reflector.

It is another important object of the present invention to provide a liquid crystal display unit equipped with the reflector.

To accomplish the object, the present invention proposes to solidify a layer of conductive filler printed on a reflector for producing a conductive pattern.

In accordance with one aspect of the present invention, there is provided a reflector comprising a body formed of insulating resin and having an outer surface and an inner surface defining a space open to an object to which a light is to be directed, and a conductive pattern printed on the outer surface for supplying an electric power to a light source placed in the space.

In accordance with another aspect of the present invention, there is provided a liquid crystal display unit for producing an image comprising a liquid crystal panel having an incident surface and an image producing surface, a driving circuit connected to the liquid crystal panel and varying the transparency of a part of the liquid crystal panel so as to transmit a light from the incident surface to the image producing surface through the part, and a light source illuminating the light incident surface with the light and including a lamp having electrodes and generating the light propagated along an optical path to the liquid crystal panel, a power supply cable having a conductive pattern and voltage application lines directly connected to one of the electrodes and connected through the conductive pattern to the other of the electrodes and a reflector formed of an insulating resin and having an outer surface where the conductive pattern is printed and an inner surface defining a space accommodating the lamp and open to the optical path for directing the light to the optical path.

In accordance with yet another aspect of the present invention, there is provided a process for producing a reflector comprising the steps of a) forming an insulating member from a first synthetic resin, b) printing a conductive filler on a surface of the insulating member, and c) solidifying the conductive filler on the surface for producing a conductive pattern.

BRIEF DESCRIPTION OF THE DRAWINGS

The features and advantages of the reflector, the process and the liquid crystal display unit equipped with the reflector will be more clearly understood from the following description taken in conjunction with the accompanying drawings in which.

DESCRIPTION OF THE PREFERRED EMBODIMENTS

First Embodiment

Reflector

Figure 1:
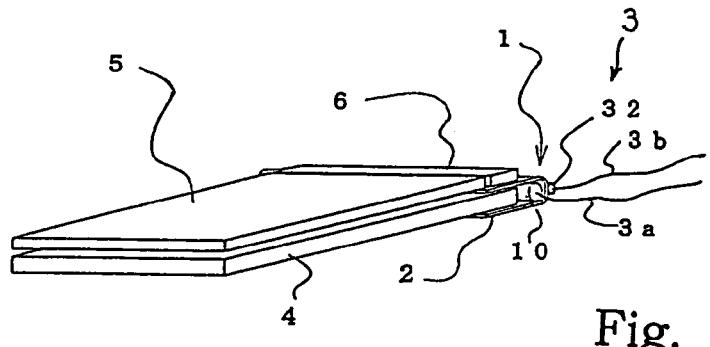
FIG. 1 is a perspective view showing the structure of the prior art liquid crystal display unit.
Figure 2:
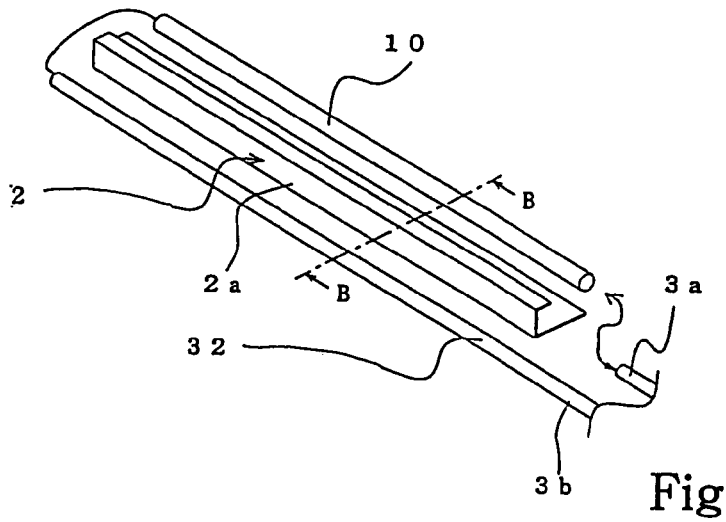
FIG. 2 is a perspective view showing the component parts of the prior art light source.
Figure 3:
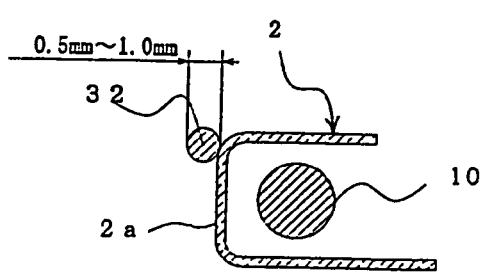
FIG. 3 is a cross sectional view taken along line B—B of FIG. 2 and showing the structure of the prior art light source.
Figure 4:
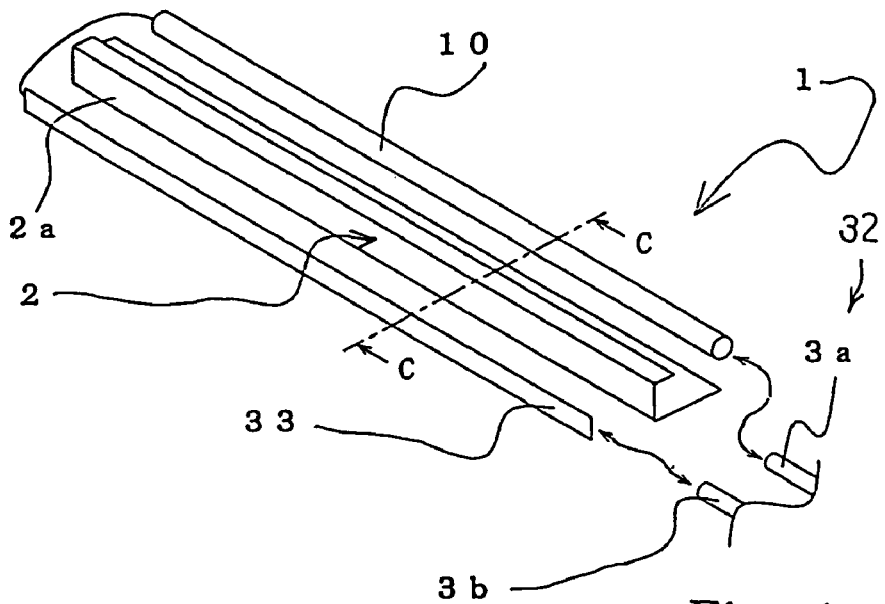
FIG. 4 is a perspective view showing the component parts of the prior art light source.
Figure 5:
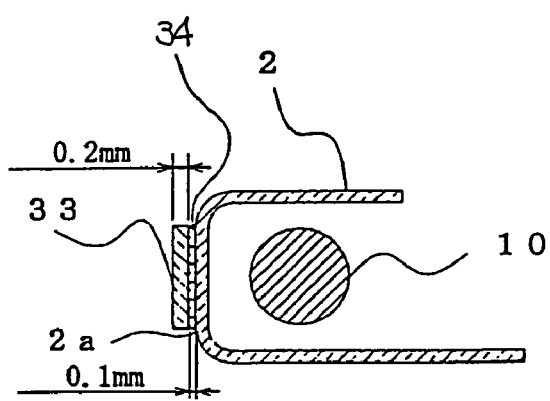
FIG. 5 is a cross sectional view taken along line C—C of FIG. 4 and showing the structure of the prior art light source.
Figure 6:
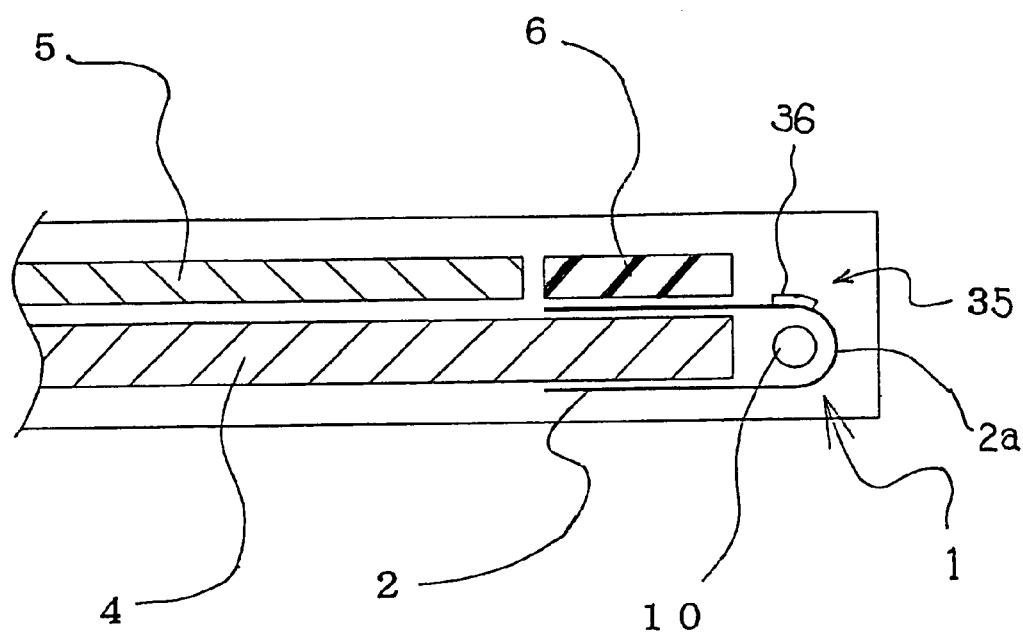
FIG. 6 is a schematic cross sectional view showing the structure of the prior art liquid crystal display unit disclosed in Japanese Patent Publication of Unexamined Application No. 10-206847.
Figure 7:
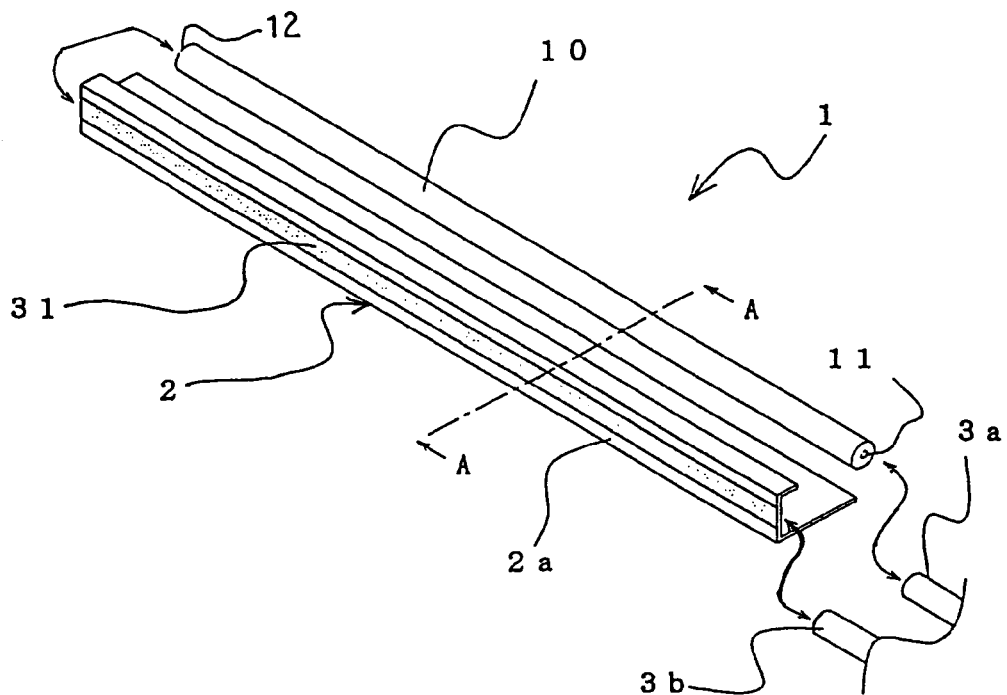
FIG. 7 is a perspective view showing the structure of a light source according to the present invention in disassembled state.
Figure 8:
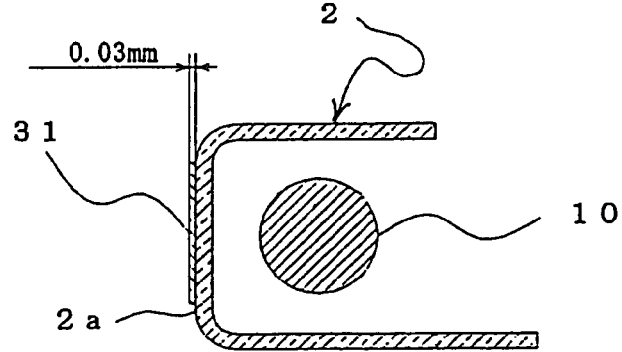
FIG. 8 is a cross sectional view taken along line A—A of FIG. 7 and showing the structure of the light source.
Figure 9:
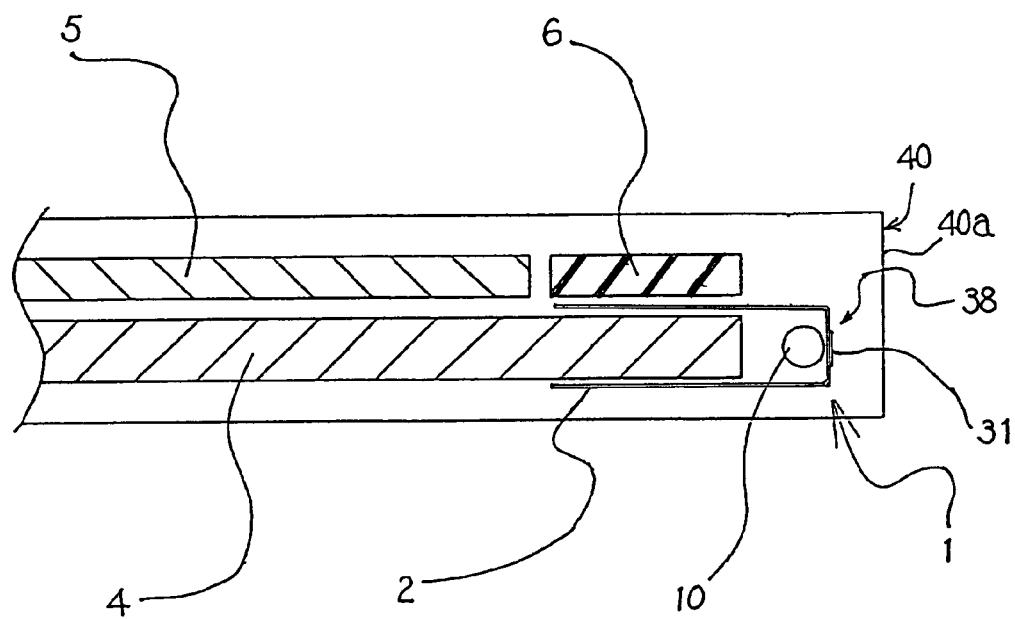
FIG. 9 is a schematic cross sectional view showing the structure of a liquid crystal display unit according to the present invention.
Figure 10:
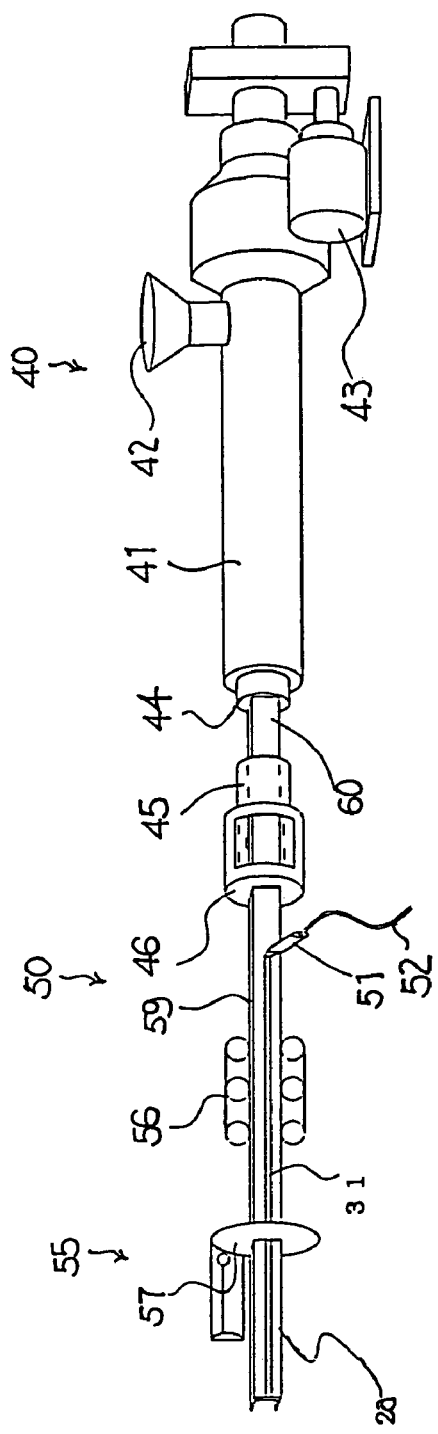
FIG. 10 is a schematic view showing the structure of an extrusion molding machine used in a process according to the present invention.

Referring to FIGS. 7 and 8 of the drawings, a light source 1 embodying the present invention comprises a reflector 2, a light source 10, a power supply cable 38 and an optical guide plate 4 (see FIG. 9). The lamp 10 is placed in an inner space defined in the reflector 2, and electric power is supplied from an electric power source (not shown) through the power supply cable 38 to the lamp 10. When the lamp 10 is energized, light is radiated from the lamp 10, and part of the light is reflected on the inner surface of the reflector 2 so as to be directed toward the optical guide plate 4.

The reflector 2 has a channel shape, and is broken down into a vertical plate portion 2a, a relatively short upper plate portion projecting from the upper edge of the vertical plate portion 2a and a relatively long lower plate portion projecting from the lower edge of the vertical plate portion 2a. The inner space is defined between the relatively short upper plate portion and the relatively long lower plate portion. The reflector 2 is formed of thermoplastic resin such as, for example, polyethylene terephthalate resin. Polycarbonate resin may be used for the reflector 2. These kinds of resin are insulating material, and do not ally electric current to flow therethrough.

A conductive pattern 31 is formed on the vertical plate portion 2a. The conductive pattern 31 straightly extends from one end of the reflector 2 to the other end. In other words, the conductive pattern 31 is formed along the shortest path in a longitudinal direction of the reflector 2. As described hereinbefore, the reflector 2 is formed of the insulating material, and, accordingly, any leakage current flows from the conductive pattern 31 through the reflector 2. The conductive pattern 31 may be screen printed on the vertical plate portion 2a of the reflector 2.

The conductive pattern 31 is formed of thermosetting resin, and is of the order of 0.03 millimeter thick. The thermosetting resin is flexible, and the cracks are less liable to take place in the conductive pattern 31 by virtue of the large flexibility. Moreover, the conductive pattern 31 is fairly thick. Although the conductive pattern 31 is thicker than the prior art conductive pattern 36 between 0.0005 millimeter thick to 0.001 millimeter thick, the conductive pattern 31 is thinner than the round cable 10 ranging between 0.5 millimeter thick and 1.0 millimeter thick and the flexible flat cable/adhesive compound layer 33/34 of 0.2 millimeter thick plus 0.1 millimeter thick. The large thickness renders the conductive pattern 31 withstanding the thermal stress, and the disconnection is less liable to take place.

The thermosetting resin is formed from a layer of conductive filler, which is screen printed on the vertical plate portion 2a. The conductive filler may be modified copolymerized polyester mixed with silver (Ag) and carbon (C). The thermosetting resin is large in adhesion to the polyethylane terephthalate resin, and the flexibility is large. For this reason, even though the thermal stress is exerted on the reflector 2, the conductive pattern 31 hardly peels off from the reflector 2.

The lamp 10 has a column shape, and a pair of electrodes 11/12 is formed on the end surfaces of the lamp 10. The electrode 11 is formed on one end surface of the lamp 10, and high voltage is applied to the electrode 11. The other electrode 12 is formed on the other end surface of the lamp 10, and low voltage is applied through the conductive pattern 31 to the electrode 12. The lamp 10 is supported by the reflector 2 by means of a suitable retainer (not shown).

Liquid Crystal Display Unit

Turning to FIG. 9 of the drawings, the light source 1 is incorporated in a liquid crystal display unit. The liquid crystal display unit further comprises a liquid crystal panel 5 and a circuit board 6. A driving circuit is integrated on the circuit board 6. The circuit board 6 is provided along a side line of the liquid crystal panel 5, and is connected to the liquid crystal panel 5. The optical guide plate 4 is overlapped with the liquid crystal panel 5 and the circuit board 6. Thus, the liquid crystal panel 5, the circuit board 6 and the light source 1 are assembled together, and are accommodated in a case 40.

When the lamp 10 is energized, light is radiated from the lamp 10 to the optical guide plate 4, and part of the light is reflected on the inner surface of the reflector 2. The reflected light is also incident onto the side surface of the optical guide plate 4. The light is propagated through the optical guide plate 4, and is output from the upper surface of the optical guide plate 4. Thus, the liquid crystal panel 5 is illuminated with the light. The driving circuit supplies an image-carrying signal and the scanning signal to data electrodes and scanning electrodes of the liquid crystal panel 5, and the transparency of the liquid crystal is partially changed. As a result, the light passes the transparent portions of the liquid crystal panel 5, and an image is produced on the liquid crystal panel 5.

While the driving circuit is producing the image on the liquid crystal panel 5, not only light but also heat is radiated toward the reflector 2, and the heat raises the temperature of the reflector 2. The heat is causative of the thermal stress. However, the conductive pattern 31 is thick enough to withstand the thermal stress. For this reason, the disconnection and the cracks are less liable to take place in the conductive pattern 31.

The image is produced on an image producing area of the liquid crystal panel 5. The liquid crystal panel 5 is exposed to a central area of the case 40. However, the peripheral area of the case is not available for the image production. As described hereinbefore, the low voltage is applied through the conductive pattern 31 to the electrode 12 of the lamp 10, and the conductive pattern 31 is of the order of 0.03 millimeter thick. This means that the manufacturer designs the case 40 in such a manner as to make the side plate 40a close to the reflector 2. The case 40 is compact. However, the image producing area is not reduced. Thus, the light source 1 according to the present invention is conducive to the compact liquid crystal display unit without sacrifice of the image production area.

Process

Description is firstly made on a process for producing the reflector 2. A manufacturing machine is used in the process. The manufacturing system is broken down into an extrusion molding machine 40, a printing machine 50, a cutting machine 55 and a thermosetting unit (not shown). The extrusion molding machine 40 produces a channel bar 59 from raw material, and the conductive pattern 31 is formed on the channel bar 59 by means of the printing machine 50. The channel bar 59 is cut into plural short channel bar 2a by means of the cutting machine 55, and the reflector 2 are obtained through the thermosetting unit (not shown).

The extrusion molding machine 40 includes a heating cylinder 41, a hopper 42, a screw (not shown), an electric motor 43, a die nozzle 44, a forming die 45 and a cooling vessel 46. The hopper 42 is attached to the heating cylinder 41, and the row material is supplied through the hopper 42 into the inner space of the heating cylinder 41. The raw material is heated so as to be softened. The screw (not shown) is provided in the inner space, and is driven for rotation by means of the electric motor 43. The soft material is pushed out through the die nozzle 44, and a bar 60 is pushed out. The bar 60 is shaped into the channel bar 59 by means of the forming die 45, and is cooled in the cooling vessel 46 for solidifying the channel bar 59. Thus, the channel bar 59 is output from the cooling vessel 46.

The printing machine 50 includes a dispenser 51. The conductive filler is supplied through a tube 52 to the dispenser 51, and the conductive filler 31a is printed on the vertical plate portion of the channel bar 59. The cutting machine 55 includes a driving roller 56 and a cutting blade 57. The driving roller 56 moves the channel bar 59 toward the cutting machine 55, and the channel bar 59 is cut into plural short channel bars 2a by means of the cutting blade 57. The short channel bars 2a are conveyed to the thermosetting unit (not shown), and the printed layers of conductive filler 31a are cured in the thermosetting unit (not shown). Thus, the reflector 2 with the conductive pattern 31 is continuously manufactured.

Figure 11:
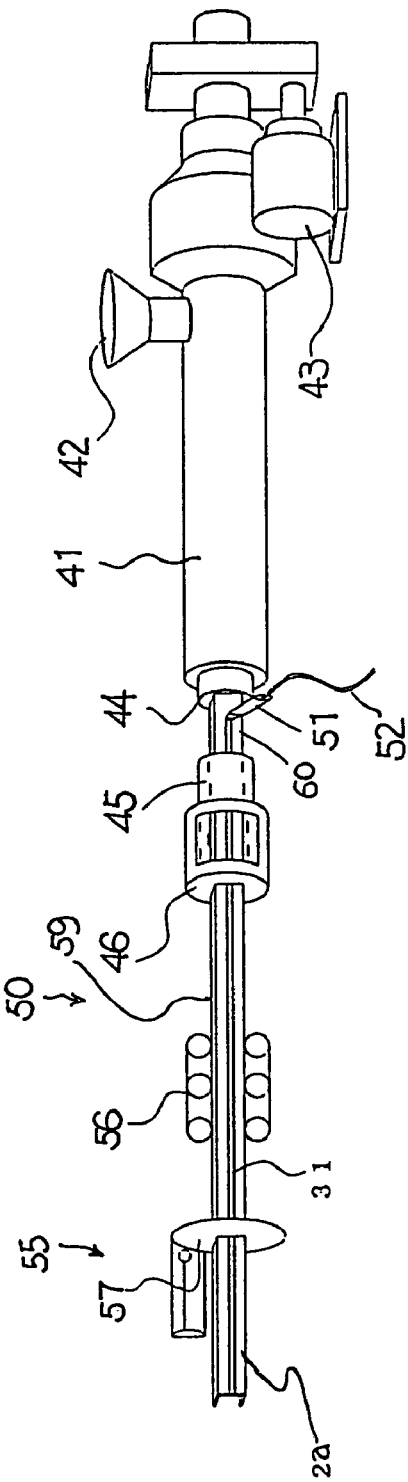
FIG. 11 is a schematic view showing the structure of the extrusion molding machine used in another process according to the present invention.

In the process described hereinbefore, the conductive filler is printed on the vertical plate portion of the channel bar 59 after the cooling step. However, the conductive filler may be printed on the vertical plate portion of the bar 60 before the cooling step as shown in FIG. 11. The bar 59 is hot. When the conductive filler is printed on the hot bar 60, the conductive filler is partially solidified through the heat exchange between the hot bar 60 and the conductive filler. This results in enhancement of adhesion between the reflector 2 and the conductive pattern 31.

As will be appreciated from the foregoing description, the conductive filler is printed on the reflector 2, and the layer of conductive filler is thermally cured. The printing technique is suitable to give the appropriate thickness to the conductive pattern 31. Thus, the reflector 2 with the conductive pattern 31 is produced through the process described hereinbefore. The printing technique does not require a long time, and is rather economical than the evaporation. The throughput is improved, and the production cost is surely reduced.

Moreover, the channel bar 59 with the layer of conductive filler is continuously produced through the manufacturing system at high speed. The throughput is further improved, and the production cost is drastically reduced.

Finally, the conductive filler is printed by using the dispenser 51. The dispenser 51 shapes the conductive filler in a stripe on the channel bar 59. For this reason, any mask is required for the printing stage.

Second Embodiment

Figure 12:
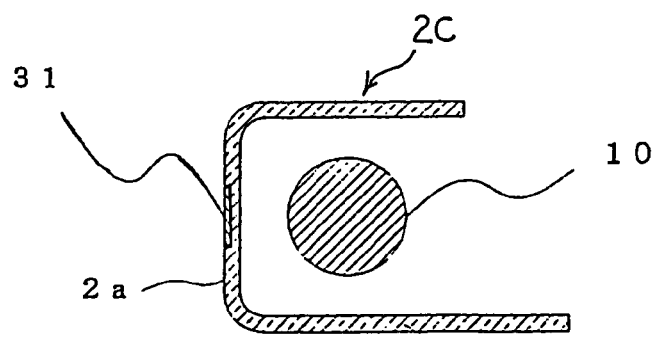
FIG. 12 is a cross sectional view showing another reflector according to the present invention.

Turning to FIG. 12 of the drawings, another reflector 2c embodying the present invention is formed with a groove elongated in the longitudinal direction thereof. The groove is formed in the vertical plate portion 2a of the reflector 2c, and is of the order of 0.03 millimeter deep. The conductive filler is printed on the bottom surface of the groove, and is solidified through the thermosetting. The conductive pattern 31 is perfectly embedded in the vertical portion of the reflector 2c, and is coplanar with the surface of the vertical plate portion 2a. Using the reflector 2c, the liquid crystal display unit is further made compact. The groove may be formed in the channel bar through a forming die.

As will be appreciated from the foregoing description, the conductive pattern 31 is printed on the reflector 2, and the printing technique gives an appropriate thickness to the conductive pattern 31. Although the thermal stress is exerted on the conductive pattern 31, the thick conductive pattern 31 withstands the thermal stress, and is free from the disconnection and cracks.

The reflector 2 and the conductive pattern 31 are respectively formed of conductive thermosetting resin and insulating thermoplastic resin, and the conductive thermosetting resin exhibits good adhesion to the insulating thermoplastic resin. Moreover, the conductive thermosetting resin is flexible. For this reason, the conductive pattern 31 is hardly separated from the reflector 2. Thus, the conductive pattern 31 is free from the peel-off.

The conductive pattern 31 is expected to achieve large resistance against the thermal stress as well as the narrow occupation space. From this aspect, the thickness of the conductive pattern is fallen within a certain range. The good adhesion between the thin conductive pattern 31 and the reflector 2 is resulted from the thermosetting resin and the thermoplastic resin in the above-described embodiments. The other combinations of the materials are available for them.

Although particular embodiments of the present invention have been shown and described, it will be apparent to those skilled in the art that various changes and modifications may be made without departing from the spirit and scope of the present invention.

Figure 13:
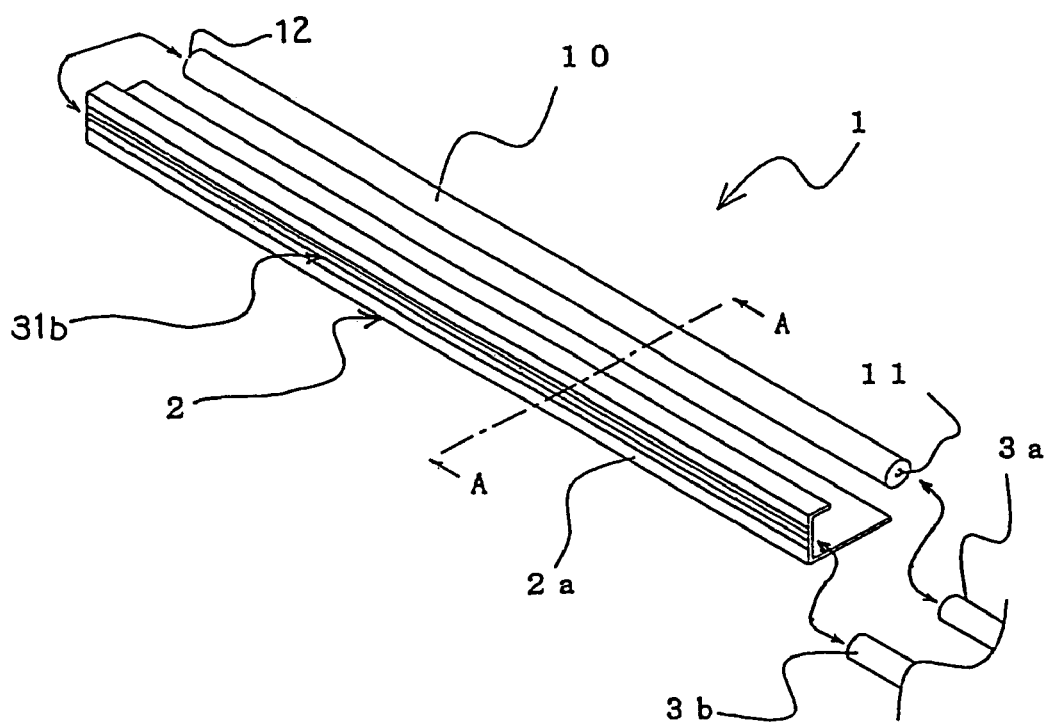
FIG. 13 is a perspective view showing the structure of yet another reflector according to the present invention.

A multiple conductive pattern 31b, i.e., plural conductive stripes may be formed on the vertical plate portion 2a in parallel to one another as shown in FIG. 13. In this instance, even if disconnection takes place in one of the plural conductive stripes, the other conductive stripes propagate the low voltage from the low voltage line 3b to the electrode 12. Thus, the multiple conductive pattern enhances the reliability of the interconnection 31.

The conductive filler may be printed on the vertical plate portion 2a through a mask by using a squeegee as popular in the screen printing.

A reflector according to the present invention may be used in another optical device such as a lighting device.

What is claimed is:

1. A process for producing a reflector, comprising:
   forming an insulating member from a first synthetic resin;
   printing a conductive filler on a surface of said insulating member;
   solidifying said conductive filler on said surface for producing a conductive pattern; and
   forming a groove in said insulating member,
   wherein said conductive pattern is formed in said groove, and
   wherein said first synthetic resin comprises a thermoplastic resin, and said conductive pattern comprises a second synthetic resin comprising a thermosetting resin containing a conductive material.

2. The process as set forth in claim 1, wherein said thermoplastic resin is selected from the group consisting of polyethylene terephthalate resin and polycarbonate resin.

3. The process as set forth in claim 2, wherein said conductive filler comprises modified copolymerized polyester, silver and carbon.

4. The process as set forth in claim 1, wherein said forming comprises:
   heating said first synthetic resin for producing a soft resin,
   extruding said soft resin for forming a hot bar member, and
   cooling said hot bar member for producing said insulating member.

5. The process as set forth in claim 1, wherein said forming comprises:
   heating said first synthetic resin for producing a soft resin, and
   extruding said soft resin for forming a hot bar member serving as said insulating member.

6. The process as set forth in claim 1, wherein said conductive filler is printed by using a dispenser.

7. The process as set forth in claim 1, wherein said first synthetic resin comprises an electrically insulating thermoplastic resin.

8. The process as set forth in claim 7, wherein said conductive filler comprises modified copolymerized polyester, silver and carbon.

9. The process as set forth in claim 1, wherein said conductive filler comprises modified copolymerized polyester, silver and carbon.

10. The process as set forth in claim 1, wherein said conductive pattern is coplanar with a surface of said insulating member to which said groove is open.

11. The process as set forth in claim 1, wherein said insulating member comprises a channel shape defining an inner space for receiving a light source.

12. The process as set forth in claim 1, wherein said insulating member comprises a channel shape defining an inner space for receiving an optical guide plate.

13. A process for producing a reflector, comprising;
   forming an insulating member from a first synthetic resin;
   printing a conductive filler on a surface of said insulating member; and
   solidifying said conductive filler on said surface for producing a conductive pattern,
   wherein said first synthetic resin comprises a thermoplastic resin, and said conductive pattern comprises a second synthetic resin comprising a thermosetting resin containing a conductive material, and
   wherein said conductive pattern comprises a plurality of conductive sub-patterns arranged parallel to one another.

14. A process for producing a reflector, comprising:
   forming a body comprising insulating resin, said body having an outer surface and an inner surface defining a space open to an object to which a light is to be directed;
   printing a conductive pattern on said outer surface for supplying an electric power to a light source placed in said space; and
   forming a groove in said body,
   wherein said conductive pattern is formed in said groove and said conductive pattern is coplanar with a surface of said body to which said groove is open, and
   wherein said insulating resin comprises a thermoplastic resin, and said conductive pattern comprises a thermosetting resin.

15. The process as set forth in claim 14, wherein said thermoplastic resin comprises a polyethylene terephthalate resin.

16. The process as set forth in claim 14, wherein said thermoplastic resin comprises a polycarbonate resin.

17. The reflector according to claim 14, wherein said conductive pattern comprises a layer of conductive filler.

18. The process as set forth in claim 17, wherein said conductive filler comprises a copolymerized polyester.

* * * * *